United States Patent
Koyama et al.

(10) Patent No.: US 11,067,166 B2
(45) Date of Patent: Jul. 20, 2021

(54) HYDRAULIC CONTROL UNIT OF VEHICLE DRIVE SYSTEM

(71) Applicants: TOYOTA JIDOSHA KABUSHIKI KAISHA, Toyota (JP); AISIN AW CO., LTD., Anjo (JP)

(72) Inventors: Daiki Koyama, Nisshin (JP); Yusuke Ohgata, Nisshin (JP); Yoshinobu Soga, Toyota (JP); Shuji Moriyama, Nagakute (JP); Hiromitsu Nitani, Okazaki (JP); Tetsuya Yamamoto, Toyota (JP); Kenichi Tsuchida, Anjo (JP); Takahiro Kokubu, Anjo (JP); Toshiaki Hayashi, Anjo (JP); Koji Makino, Anjo (JP); Yuta Seriguchi, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 101 days.

(21) Appl. No.: 16/667,024

(22) Filed: Oct. 29, 2019

(65) Prior Publication Data
US 2020/0132187 A1   Apr. 30, 2020

(30) Foreign Application Priority Data
Oct. 29, 2018 (JP) .............................. JP2018-203304

(51) Int. Cl.
*F16H 61/02* (2006.01)
*F16H 57/04* (2010.01)
*F16H 59/02* (2006.01)

(52) U.S. Cl.
CPC ..... *F16H 61/0262* (2013.01); *F16H 57/0446* (2013.01); *F16H 59/0204* (2013.01); *F16H 61/0274* (2013.01); *F16H 2710/20* (2013.01)

(58) Field of Classification Search
CPC ............. F16H 61/0262; F16H 57/0446; F16H 61/0274; F16H 59/0204; F16H 2710/20;
(Continued)

(56) References Cited

U.S. PATENT DOCUMENTS

| | | | |
|---|---|---|---|
| 2013/0192929 A1* | 8/2013 | Takagi | ................ F16H 57/0404 184/6.24 |
| 2020/0132187 A1* | 4/2020 | Koyama | ............. F16H 61/0031 |

FOREIGN PATENT DOCUMENTS

| | | |
|---|---|---|
| JP | 2013-133871 A | 7/2013 |
| JP | 2014-202348 A | 10/2014 |

(Continued)

*Primary Examiner* — Tinh Dang
(74) *Attorney, Agent, or Firm* — Oliff PLC

(57) ABSTRACT

A hydraulic control unit of a vehicle drive system including an automatic transmission, and an oil pump device, includes: a first electromagnetic valve; a second electromagnetic valve; first and second oil passages; a third oil passage; a manual valve operated to connect and disconnect the first and third oil passages and a drain oil passage to and from each other, in response to an operation of a manually operated shifting device by a vehicle operator, such that the first oil passage is connected to the third oil passage when the shifting device is placed in a first operating position, while the first oil passage is connected to the drain oil passage when the shifting device is placed in a second operating position; an accumulator connected to the first oil passage; and a check valve provided in the second oil passage.

6 Claims, 3 Drawing Sheets

(58) Field of Classification Search
CPC ......... F16H 2061/0034; F16H 61/0031; F16H 61/0206; F16H 61/0003; F16H 61/0009
See application file for complete search history.

(56) References Cited

FOREIGN PATENT DOCUMENTS

| | | |
|---|---|---|
| JP | 2017-145957 A | 8/2017 |
| WO | 2013/011587 A1 | 1/2013 |
| WO | 2013/027287 A1 | 2/2013 |

\* cited by examiner

HYDRAULIC CONTROL UNIT OF VEHICLE DRIVE SYSTEM

This application claims priority from Japanese Patent Application No. 2018-203304 filed on Oct. 29, 2018, the disclosure of which is incorporated herein by reference in its entirety.

FIELD OF THE INVENTION

The present invention relates to a hydraulic control unit of a drive system of a vehicle including an automatic transmission and an oil pump.

BACKGROUND OF THE INVENTION

There is well known a hydraulic control unit of a drive system of a vehicle including an automatic transmission having a plurality of hydraulic actuators, and an oil pump operable to pressurize a working fluid for controlling the hydraulic actuators. JP2014-202348A discloses an example of such a hydraulic control unit for an automatic transmission. The hydraulic control unit disclosed in this publication includes electromagnetic valves to generate hydraulic pressures for operating the respective hydraulic actuators, by regulating a predetermined desired line pressure of a working fluid generated by the oil pump. The hydraulic control unit further includes an accumulator connected to a line pressure oil passage through which the working fluid having the regulated hydraulic pressure flows.

By the way, it is considered to provide the hydraulic control unit with a manual valve which receives the line pressure and which is operated in response to an operation of a manually operated shifting device by an operator of the vehicle, to selectively connect and disconnect oil passages to and from each other. The pressurized working fluid is supplied to the above-described electromagnetic valves and accumulator through the manual valve. When the manually operated shifting device is placed in a first operating state, oil passages connected to the electromagnetic valves and accumulator are held in communication with the line pressure oil passage. When the manually operated shifting device is placed in a second operating state, the oil passages connected to the electromagnetic valves and accumulator are held in communication with a drain oil passage. It is also considered to apply the line pressure directly to a second electromagnetic valve, without a flow of the pressurized working fluid through the manual valve, so that the line pressure is regulated into a second hydraulic pressure to be applied to a second hydraulic actuator. In this case, the second hydraulic actuator is operated irrespective of the operating state of the manually operated shifting device. However, when the manually operated shifting device is switched from the second operating state to the first operating state, the line pressure may be temporarily reduced due to a lower rate of delivery of the pressurized working fluid from the oil pump than a rate of flow of the working fluid into the accumulator to charge the accumulator. Accordingly, the line pressure to be applied to the second electromagnetic valve is temporarily reduced, giving rise to a risk that the second hydraulic actuator operated with the second hydraulic pressure generated by the second electromagnetic valve is temporarily placed in an inadequate or undesired operating state.

SUMMARY OF THE INVENTION

The present invention was made in view of the background art described above. It is therefore an object of the present invention to provide a hydraulic control unit of a vehicle drive system, which permits the second hydraulic actuator to be kept in the adequate or desired operating state, even when the second hydraulic actuator is operated with the second hydraulic pressure generated by the second electromagnetic valve without a flow of the pressurized working fluid through the manual valve, as a result of switching of the manually operated shifting device from the second operating state to the first operating state.

The object indicated above is achieved according to the following modes of the present invention:

According to a first mode of the invention, there is provided a hydraulic control unit of a drive system of a vehicle including an automatic transmission having a plurality of hydraulic actuators, and an oil pump device configured to pressurize a working fluid for controlling the hydraulic actuators, comprising: a first electromagnetic valve for generating a first hydraulic pressure to operate a first hydraulic actuator of the plurality of hydraulic actuators; a second electromagnetic valve for generating a second hydraulic pressure to operate a second hydraulic actuator of the plurality of hydraulic actuators; a first oil passage connected to the first electromagnetic valve so that a source pressure for the first hydraulic pressure is applied to the first electromagnetic valve; a second oil passage connected to the second electromagnetic valve so that a source pressure for the second hydraulic pressure is applied to the second electromagnetic valve; a third oil passage connected to the oil pump device and the second oil passage such that a pressure of the working fluid delivered from the oil pump device and flowing through the third oil passage is regulated to a predetermined value; a manual valve which is operated to connect and disconnect the first oil passage, the third oil passage and a drain oil passage to and from each other, in response to an operation of a manually operated shifting device by an operator of the vehicle, such that the first oil passage is connected to the third oil passage when the shifting device is placed in a first operating position, while the first oil passage is connected to the drain oil passage when the shifting device is placed in a second operating position; an accumulator connected to the first oil passage; and a check valve provided in the second oil passage, to prevent a flow of the working fluid in a direction from the second electromagnetic valve toward the third oil passage.

According to a second mode of the invention, the hydraulic control unit according to the first mode of the invention is provided with the oil pump device including a mechanical oil pump operated by an engine provided as a drive power source of the vehicle, to deliver the pressurized working fluid.

According to a third mode of the invention, the hydraulic control unit according to the second mode of the invention is provided with the oil pump device further including an electric oil pump which is disposed in parallel with the mechanical oil pump and which is operated by an oil pump drive electric motor, to deliver the pressurized working fluid.

According to a fourth mode of the invention, the hydraulic control unit according to any one of the first through third modes of the invention is configured to control the first hydraulic actuator for operating a first coupling device, and the second hydraulic actuator for operating a second coupling device, such that an engaging action of the second coupling device is preferentially initiated prior to a moment of initiation of an engaging action of the first coupling device.

According to a fifth mode of the invention, the hydraulic control unit according to any one of the first through third modes of the invention is configured to control the first hydraulic actuator for operating a frictional coupling device, and the second hydraulic actuator for operating a dog clutch, such that the frictional coupling device and the dog clutch are both brought into engaged states, to establish a power transmitting path through the automatic transmission.

According to a sixth mode of the invention, the hydraulic control unit according to any one of the first through fifth modes of the invention is configured to control the automatic transmission such that the automatic transmission is placed in a power transmitting state in which a power transmitting path is formed through the automatic transmission in the first operating position of the manually operated shifting device, and is placed in a power cutoff state in which the power transmitting path is not formed through the automatic transmission in the second operating position of the manually operated shifting device.

As described above, the hydraulic control unit according to the first mode of the invention comprises: the first oil passage connected to the first electromagnetic valve so that the source pressure for the first hydraulic pressure is applied to the first electromagnetic valve; the second oil passage connected to the second electromagnetic valve so that the source pressure for the second hydraulic pressure is applied to the second electromagnetic valve; the third oil passage connected to the oil pump device and the second oil passage such that the pressure of the working fluid delivered from the oil pump device and flowing through the third oil passage is regulated to the predetermined value; the manual valve which is operated to connect and disconnect the first oil passage, the third oil passage and the drain oil passage to and from each other, in response to the operation of the manually operated shifting device by the operator of the vehicle, such that the first oil passage is connected to the third oil passage when the shifting device is placed in the first operating position, while the first oil passage is connected to the drain oil passage when the shifting device is placed in the second operating position; the accumulator connected to the first oil passage; and the check valve provided in the second oil passage, to prevent the flow of the working fluid in the direction from the second electromagnetic valve toward the third oil passage. Accordingly, even if the pressure of the working fluid flowing through the third oil passage is lowered below the above-indicated predetermined value due to a flow of the working fluid into the accumulator upon switching of the shifting device from the second operating position to the first operating position, a drop of the source pressure for the second hydraulic pressure to be generated by the second electromagnetic valve is prevented by the check valve. Thus, the present hydraulic control unit permits the second hydraulic actuator to be kept in the adequate or desired operating state, even when the second hydraulic actuator is operated with the second hydraulic pressure generated by the second electromagnetic valve without a flow of the pressurized working fluid through the manual valve, as a result of switching of the manually operated shifting device from the second operating position to the first operating position. Namely, the present hydraulic control unit permits a device operated by the second hydraulic actuator to be kept in an adequate or desired operating state upon switching of the shifting device from the second operating position to the first operating position.

The hydraulic control unit according to the second mode of the invention is provided with the oil pump device including the mechanical oil pump operated by the engine provided as the vehicle drive power source, to deliver the pressurized working fluid. In this mode of the invention, there is a risk that the pressure of the working fluid flowing through the third oil passage cannot be quickly raised to the predetermined value when an engine idling stop control implemented to temporarily stop the idling operation of the engine is terminated. In the process of implementation of the engine idling stop control, however, the source pressure for the second hydraulic pressure to be generated by the second electromagnetic valve is kept unchanged in the presence of the check valve. Accordingly, the device to be operated by the second hydraulic actuator can be kept in the desired operating state after the engine idling stop control is terminated. Further, it is possible to reduce a need of increasing the size of the mechanical oil pump for the purpose of quickly raising the hydraulic pressure in the third oil passage to the predetermined value upon termination of the engine idling stop control.

In the hydraulic control unit according to the third mode of the invention, the oil pump device further includes the electric oil pump which is disposed in parallel with the mechanical oil pump and which is operated by the oil pump drive electric motor, to deliver the pressurized working fluid. The electric oil pump can deliver the pressurized working fluid even in the process of the engine idling stop control, for instance. On the other hand, the pressure of the working fluid flowing through the third oil passage may be temporarily lowered below the predetermined value when the shifting device is operated from the second operating position to the first operating position in the process of the engine idling stop control. However, the check valve prevents a drop of the source pressure applied to the second electromagnetic valve, in spite of the temporary drop of the pressure of the working fluid flowing through the third oil passage. Accordingly, it is possible to reduce a need of increasing the size of the electric oil pump to deal with the temporary drop of the pressure in the third oil passage.

The hydraulic control unit according to the fourth mode of the invention is configured to control the first and second actuators such that the engaging action of the second coupling device operated by the second hydraulic actuator is preferentially initiated prior to the moment of initiation of the engaging action of the first coupling device operated by the first hydraulic actuator. Accordingly, there is a risk of delayed switching of the first coupling device to its engaged state, due to the initiation of the engaging action of the first coupling device in the engaged state of the second coupling device after the rise of the pressure of the third oil passage to the predetermined value, as a result of switching of the shifting device from the second operating position to the first operating position. However, the check valve provided in the present hydraulic control unit prevents a drop of the source pressure applied to the second electromagnetic valve, in spite of a temporary drop of the pressure of the third oil passage below the predetermined value, so that it is possible to initiate the engaging action of the first coupling device in the engaged state of the second coupling device, without a need of raising the pressure of the third oil passage to the predetermined value, so that the risk of the delayed switching of the first coupling device to its engaged state can be reduced.

The hydraulic control unit according to the fifth mode of the invention is configured to control the first and second hydraulic actuators for respectively operating the frictional coupling device and the dog clutch, such that the frictional coupling device and the dog clutch are both brought into the engaged states, to establish the power transmitting path through the automatic transmission. Accordingly, it is desirable to initiate the engaging action of the frictional coupling device in the engaged state of the dog clutch, in view of a risk of failure of the dog clutch to be brought into its engaged state if the engaging action of the dog clutch is initiated in the engaged state of the frictional coupling device. However, the check valve provided in the present hydraulic control unit prevents a drop of the source pressure applied to the second electromagnetic valve, in spite of a temporary drop of the pressure of the third oil passage below the predetermined value upon switching of the shifting device from the second operating position to the first operating position, so that it is possible to keep the second coupling device in its engaged state, and therefore possible to reduce the risk of the delayed switching of the first coupling device to its engaged state, even where the engaging action of the first coupling device is initiated in the engaged state of the second coupling device.

The hydraulic control unit according to the sixth mode of the invention is configured to control the automatic transmission such that the automatic transmission is placed in the power transmitting state and the power cutoff state in the respective first and second operating positions of the manually operated shifting device. Accordingly, the second hydraulic actuator is operated with the second hydraulic pressure which is generated by the second electromagnetic valve on the basis of the source pressure applied to the second electromagnetic valve through the third and second oil passages without a flow of the pressurized working fluid through the manual valve, so that the second electromagnetic valve can be kept in the adequate or desired operating state.

DETAILED DESCRIPTION OF PREFERRED EMBODIMENTS

Figure 1:
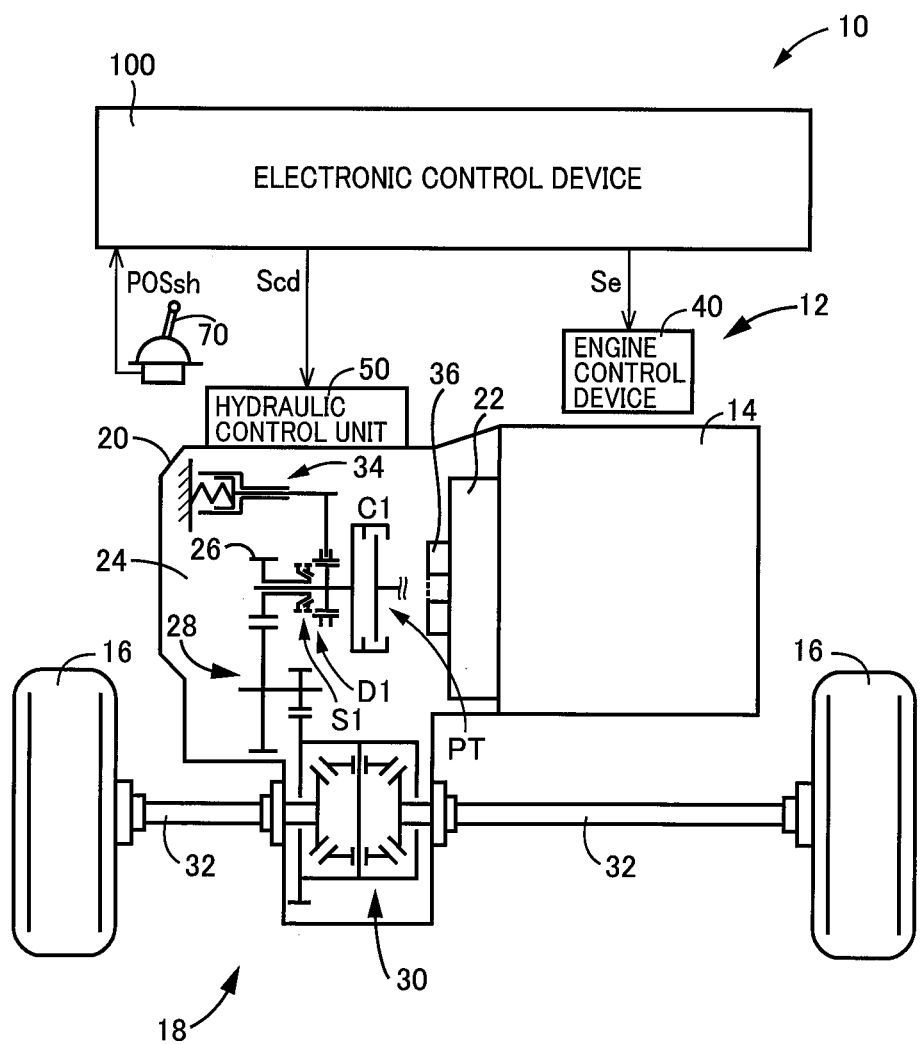
FIG. 1 is a schematic view showing an arrangement of a vehicle drive system provided with a hydraulic control unit constructed according to one embodiment of this invention.

Referring to the drawings, preferred embodiments of the present invention will be described in detail.

First Embodiment

Reference is first made to FIG. 1, which is the schematic view showing an arrangement of a drive system 12 of a vehicle 10, which is provided with a hydraulic control unit 50 constructed according to a first embodiment of this invention. As shown in FIG. 1, the vehicle drive system 12 includes an engine 14, drive wheels 16, and a power transmitting device 18 disposed in a power transmitting path between the engine 14 and the drive wheels 16.

The engine 14 is a vehicle drive power source, which is a known internal combustion engine such as a gasoline engine or a diesel engine. The vehicle 10 is provided with an electronic control device 100, and an engine control device 40 including a throttle actuator, a fuel injecting device and an igniting device, which are controlled by the electronic control device 100 to control an output torque Te of the engine 14.

The power transmitting device 18 includes a torque converter 22 connected to the engine 14, an automatic transmission 24 connected to the torque converter 22, a speed reducing gear mechanism 28 connected to an output rotary member in the form of an output gear 26 of the automatic transmission 24, and a differential gear 30 connected to the speed reducing gear mechanism 28. These torque converter 22, automatic transmission 24, speed reducing gear mechanism 28 and differential gear 30 are disposed within a stationary member in the form of a casing 20 fixed to a body of the vehicle 10. The power transmitting device 18 further includes right and left drive shafts 32 connected to the differential gear 30. In the power transmitting device 18, a drive force generated by the engine 14 is transmitted to the drive wheels 16 through the torque converter 22, automatic transmission 24, speed reducing gear mechanism 28, differential gear 30 and drive shafts 32, in this order of description. The drive force referred to above is equivalent to a torque or power, unless otherwise distinguished from each other.

The automatic transmission 24 has a power transmitting path PT which is established when both of a friction clutch C1 and a dog clutch D1 are placed in their engaged states. The friction clutch C1 is a known hydraulically operated frictional coupling device which is selectively placed in its engaged and released states with an operation of a hydraulic actuator C1$a$, which will be described by reference to FIG. 2. The dog clutch D1 is disposed in a power transmitting path between the friction clutch C1 and the output gear 26, and selectively places this power transmitting path in a power transmitting state or a power cutoff state. The dog clutch D1 is provided with a synchronizer meshing mechanism S1 for synchronization of rotary motions of its input and output rotary elements when the dog clutch D1 is brought into its engaged state. The dog clutch D1 is selectively placed in its engaged and released states with an operation of a hydraulic actuator 34 provided in the automatic transmission 24. The friction clutch C1 and the dog clutch D1 are switched between their engaged and released states by the respective hydraulic actuators C1$a$ and 34 which are respectively operated with a C1 control hydraulic pressure Pc1 and a synchronization control hydraulic pressure Ps1, which will be described by reference to FIG. 2. These C1 and synchronization control hydraulic pressures Pc1 and Ps1 are generated from the hydraulic control unit 50 provided to control the vehicle drive system 12. Thus, the automatic transmission 24 is provided with the two hydraulic actuators C1$a$ and 34. Namely, the hydraulic actuator C1$a$ for the friction clutch C1 provided as a first coupling device is a first hydraulic actuator, while the hydraulic actuator 34 for the dog clutch D1 provided as a second coupling device is a second hydraulic actuator.

When the power transmitting path PT is established with the friction clutch C1 and the dog clutch D1 being both placed in their engaged states, the automatic transmission 24 is placed in its power transmitting state in which the drive force of the engine 14 is transmitted to the output gear 26 through the power transmitting path PT. When the power transmitting path PT is not established with at least one of the friction and dog clutches C1 and D1 being placed in its released state, on the other hand, the automatic transmission 24 is placed in its power cutoff state, namely, in its neutral state in which the drive force cannot be transmitted through the power transmitting path PT.

The vehicle drive system 12 is provided with an oil pump device operable to pressurize a working fluid, that is, to deliver a pressurized working fluid, so that the pressurized working fluid is supplied to the hydraulic control unit 50. In the present embodiment, an MOP 36 which is a mechanical oil pump is provided as the oil pump device. The MOP 36 is operated by the engine 14 to deliver the pressurized working fluid.

For example, the above-indicated electronic control device 100 is a so-called microcomputer incorporating a CPU, a ROM, a RAM and an input-output interface. The CPU performs various controls of the vehicle 10, by implementing various input signal processing operations, according to control programs stored in the ROM, while utilizing a temporary data storage function of the RAM. The various controls of the vehicle 10 include an output control of the engine 14, and hydraulic controls of the operating states of the coupling devices (friction clutch C1 and dog clutch D1).

The electronic control device 100 receives output signals of various sensors provided on the vehicle 10, such as: a signal indicative of an operating speed of the engine 14; a signal indicative of a running speed of the vehicle 10; a signal indicative of an operation amount of an accelerator pedal; and a signal indicative of a presently selected operating position POSsh of a manually operated shifting device in the form of a shift lever 70. The electronic control device 100 generates various output signals to be applied to various devices provided on the vehicle 10, such as the engine control device 40 and the hydraulic control unit 50. These various output signals include: engine control command signals Se for controlling the engine 14, and hydraulic control command signals Scd for controlling the operating states of the coupling devices.

The shift lever 70 has a plurality of operating positions such as a parking position P, a reverse drive position R, a neutral position N and a forward drive position D, one of which is selected as the presently selected operating position POSsh, for placing the automatic transmission 24 in a selected one of operating positions. When the shift lever 70 is placed in the parking position P, the automatic transmission 24 is placed in its neutral state in which the output gear 26 is mechanically locked so as to be held stationary. When the shift lever 70 is placed in the reverse drive position R, the automatic transmission 24 is placed in its reverse drive state in which the vehicle 10 can be driven in the reverse direction. When the shift lever 70 is placed in the neutral position N, the automatic transmission 24 is placed in its neutral state in which the output gear 26 is not mechanically locked. When the shift lever 70 is placed in the forward drive position D, the automatic transmission 24 is placed in its forward drive state in which the vehicle 10 can be driven in the forward direction. In the reverse drive state and the forward drive state of the automatic transmission 24, the drive force can be transmitted through the automatic transmission 24. In the neutral state of the automatic transmission 24 established in the parking position P or neutral position N, the drive force cannot be transmitted through the automatic transmission 24. Each of the forward drive position D and the reverse drive position R of the shift lever 70 is considered to be a first operating position selected to place the automatic transmission 24 in its power transmitting state, while each of the parking position P and the neutral position N of the shift lever 70 is considered to be a second operating position selected to place the automatic transmission 24 in its power cutoff state.

Figure 2:
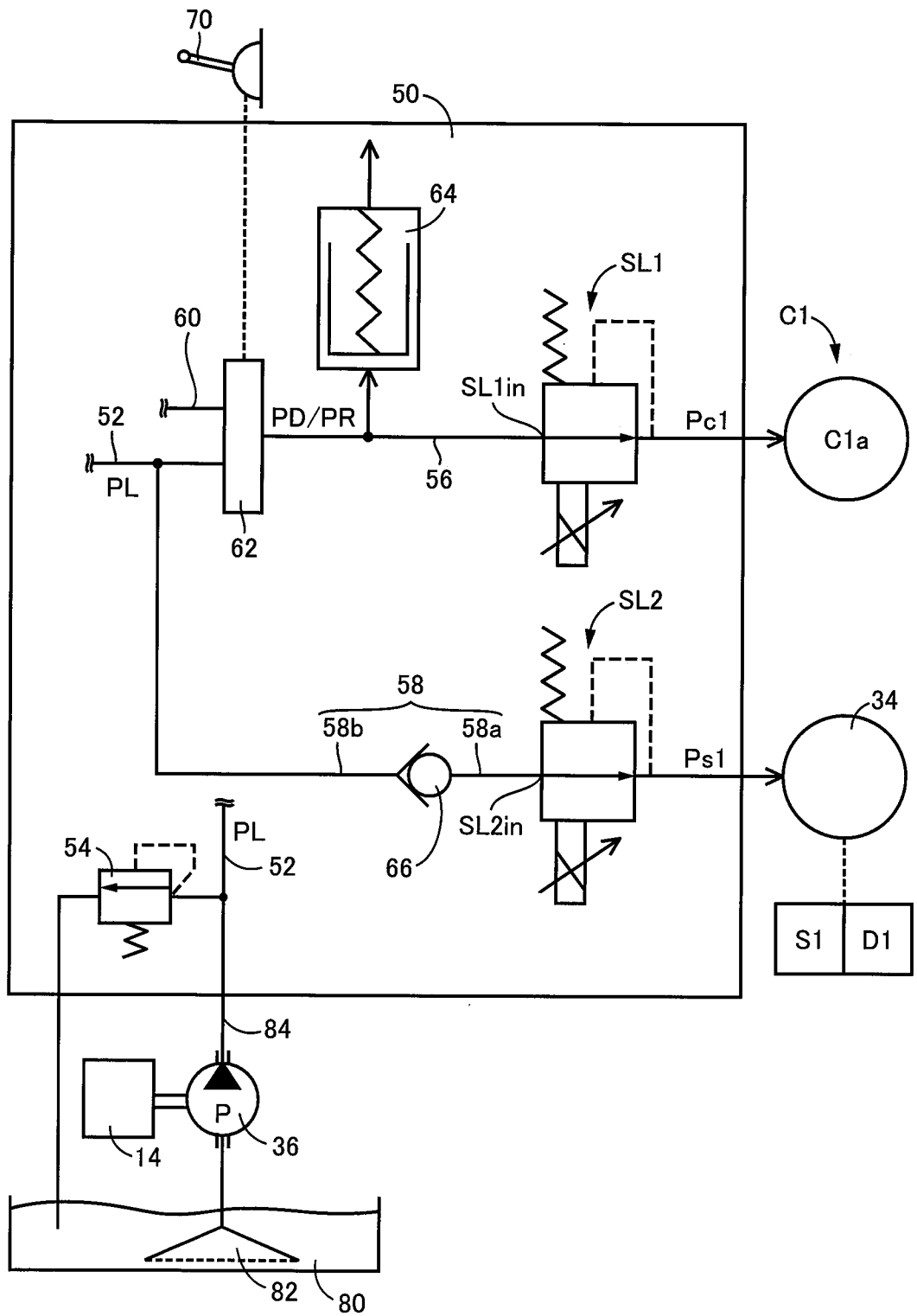
FIG. 2 is a view showing portions of the hydraulic control unit, which are assigned to control hydraulic pressures applied to a friction clutch and a dog clutch, and a hydraulic pressure source device provided to deliver a pressurized working fluid to the hydraulic control unit.

Reference is then made to FIG. 2, which is the view showing portions of the hydraulic control unit 50, which are assigned to control hydraulic pressures to be applied to the friction clutch C1 and the dog clutch D1, and a hydraulic pressure source device provided to deliver the pressurized working fluid to the hydraulic control unit 50.

As shown in FIG. 2, the MOP 36 is operated to suck, through a strainer 82, the working fluid returned from the hydraulic control unit 50 back to an oil pan 80 disposed in a lower portion of the casing 20, to pressurize the working fluid, and deliver the pressurized working fluid into the hydraulic control unit 50 through a delivery oil passage 84. The delivery oil passage 84 is connected directly to a line pressure oil passage 52 in the hydraulic control unit 50. The working fluid having a line pressure PL flows through the line pressure oil passage 52. Thus, the pressurized working fluid delivered from the MOP 36 has the line pressure PL which is a source pressure to be controlled into a C1 control hydraulic pressures Pc1 and a synchronization control hydraulic pressure Ps1 for switching the operating states of the friction clutch C1 and the dog clutch D1, as described below in detail. The pressurized working fluid delivered from the MOP 36 is also used to lubricate various portions of the power transmitting device 18.

The hydraulic control unit 50 is provided with a pressure regulator valve 54, a C1 control solenoid-operated valve SL1, a D1 control solenoid-operated valve SL2, a C1 source pressure oil passage 56, a D1 source pressure oil passage 58, a drain oil passage 60, a manual valve 62, and an accumulator 64, in addition to the above-indicated line pressure oil passage 52.

The pressure regulator valve 54 functions to regulate the hydraulic pressure of the pressurized working fluid delivered from the MOP 36, into the line pressure PL. Thus, the line pressure PL is a predetermined desired hydraulic pressure established by regulating the hydraulic pressure of the pressurized working fluid delivered from the MOP 36.

The C1 control solenoid-operated valve SL1 is a first electromagnetic valve configured to generate a first hydraulic pressure in the form of a C1 control hydraulic pressure Pc1 for operating the hydraulic actuator C1a of the friction clutch C1, while the D1 control solenoid-operated valve SL2 is a second electromagnetic valve configured to generate a second hydraulic pressure in the form of a D1 control hydraulic pressure Ps1 for operating the hydraulic actuator 34 of the dog clutch D1. These C1 control solenoid-operated valve SL1 and D1 control solenoid-operated valve SL2 are linear solenoid valves, for instance.

The C1 source pressure oil passage 56 is a first oil passage which is connected to an input port SL1in of the C1 control solenoid-operated valve SL1 and which is an oil passage for flowing of the working fluid having a source pressure for the C1 control hydraulic pressure Pc1, namely, a C1 source pressure applied to the C1 control solenoid-operated valve SL1, while the D1 source pressure oil passage 58 is a second oil passage which is connected to an input port SL2in of the D1 control solenoid-operated valve SL2 and which is an oil passage for flowing of the working fluid having a source pressure for the synchronization control hydraulic pressure Ps1, namely, a D1 source pressure applied to the D1 control solenoid-operated valve SL2. The line pressure oil passage 52 is a third oil passage to which the D1 source pressure oil passage 58 is connected and which is an oil passage for flowing of the working fluid having the line pressure PL. The drain oil passage 60 is an oil passage which is open to the atmosphere and through which the working fluid is discharged out of the hydraulic control unit 50 and returned to the oil pan 80.

The manual valve 62 is mechanically linked with the shift lever 70, and is operated in response to an operation of the shift lever 70, to selectively connect and disconnect the C1 source pressure oil passage 56, the line pressure oil passage 52 (D1 source pressure oil passage 58) and the drain oil passage 60 to and from each other. When the shift lever 70 is operated to the above-indicated first operating position (forward drive position D or reverse drive position R), the manual valve 62 is operated to connect the C1 source pressure oil passage 56 to the line pressure oil passage 52. The first operating position is the forward drive position D when the drive force is transmitted to drive the vehicle 10 in the forward direction, through the power transmitting path PT established in the engaged states of the friction clutch C1 and the dog clutch D1. That is, when the shift lever 70 is placed in the forward drive position D, the line pressure PL received by the manual valve 62 is output as a forward drive pressure PD to the C1 source pressure oil passage 56. The first operating position is the reverse drive position R when the drive force is transmitted to drive the vehicle 10 in the reverse direction, through the power transmitting path PT. That is, when the shift lever 70 is placed in the reverse drive position R, the line pressure PL received by the manual valve 62 is output as a reverse drive pressure PR to the C1 source pressure oil passage 56.

When the shift lever 70 is operated to the above-indicated second operating position (parking position P or neutral position N), the manual valve 62 is operated to disconnect the C1 source pressure oil passage 56 and the line pressure oil passage 52 from each other, and to connect the C1 source pressure oil passage 56 to the drain oil passage 60. Namely, when the shift lever 70 is operated to the second operating position (parking position P or neutral position N), the manual valve 62 is operated so that the working fluid having the forward drive pressure PD or reverse drive pressure PR is discharged from the C1 source pressure oil passage 56 out of the hydraulic control unit 50, through the drain oil passage 60.

The accumulator 64 is connected to the C1 source pressure oil passage 56. The accumulator 64 is a known pressure storage device which is provided with a spring, and a sealing member for preventing leakage of the working fluid, and which is configured to store and supply the pressurized working fluid. When the C1 source pressure in the C1 source pressure oil passage 56 is higher than the hydraulic pressure within the accumulator 64, the working fluid is fed from the C1 source pressure oil passage 56 into the accumulator 64. When the hydraulic pressure within the accumulator 64 is higher than the C1 source pressure in the C1 source pressure oil passage 56, the working fluid is fed from the accumulator 64 into the C1 source pressure oil passage 56.

By the way, when the shift lever 70 is switched from the second operating position (parking position P or neutral position N) to the first operating position (forward drive position D or reverse drive position R), the accumulator 64 is automatically charged with the pressurized working fluid. In the process of charging of the accumulator 64, a rate of flow of the working fluid consumed by the hydraulic control unit 50 is likely to be higher than a rate of flow of the working fluid delivered into the hydraulic control unit 50, giving rise to a risk of a temporary drop of the line pressure PL. Accordingly, the D1 source pressure applied to the D1 control solenoid-operated valve SL2 may be temporarily reduced, giving rise to a risk that the dog clutch D1 operated with the synchronization control hydraulic pressure Ps1 generated from the D1 control solenoid-operated valve SL2 is temporarily placed in an inadequate or undesired operating state. For instance, there is a risk that the dog clutch D1 which should be kept in its engaged state is temporarily placed in its released state. Further, when the power transmitting path PT is established with the engaging actions of the friction clutch C1 and the dog clutch D1, there is a risk that the dog clutch D1 cannot be brought into its engaged state, where an engaging action of the dog clutch D1 which has been held in its released state is initiated in the engaged state of the friction clutch C1. In view of the problem described above, the present embodiment is arranged such that the engaging action of the dog clutch D1 is preferentially initiated prior to a moment of initiation of an engaging action of the friction clutch C1. Described more specifically, when the shift lever 70 is switched from the second operating position to the first operating position, the engaging action of the friction clutch C1 is initiated only after the dog clutch D1 which had been once placed in the released state has been restored into its engaged state owing to a rise of the line pressure PL. However, this arrangement of the present embodiment causes a risk of delayed switching of the friction clutch C1 to its engaged state. A possibility of the undesirable phenomenon described above increases with a decrease of the size of the MOP 36 to improve the fuel economy of the engine 14, and is relatively high when an operating speed Ne of the engine 14 is held relatively low for improvement of its fuel economy and reduction of its operating noise.

To avoid the undesirable phenomenon described above, the hydraulic control unit 50 is further provided with a check valve 66 in the D1 source pressure oil passage 58. This check valve 66 prevents a flow of the working fluid in a direction from the D1 control solenoid-operated valve SL2 toward the line pressure oil passage 52. Described more specifically, the D1 source pressure oil passage 58 consists of an SL2-side section 58a connected to the D1 control solenoid-operated valve SL2, and an MOP-side section 58b connected to the line pressure oil passage 52. The check valve 66 prevents a flow of the working fluid from the SL2-side section 58a toward the MOP-side section 58b.

The electronic control device 100 controls the vehicle drive system 12 to implement a known engine idling stop control for temporarily holding the engine 14 at rest, if a predetermined engine stop condition is satisfied while the shift lever 70 is placed in the forward drive position D, for example. The engine stop condition is satisfied when the vehicle 10 is held stationary with the accelerator pedal being placed in its non-operated position, and with a brake pedal being placed in an operated position. When the engine 14 is automatically held at rest as a result of the engine idling stop control, the MOP 36 is not operated to deliver the pressurized working fluid. As a result, the dog clutch D1 placed in the engaged state is brought into the released state, in the absence of the check valve 66 in the hydraulic control unit 50. When the engine idling stop control is terminated, the line pressure PL cannot be quickly raised to a predetermined suitable value, due to a flow of the pressurized working fluid into the accumulator 64. Accordingly, the engaging action of the dog clutch D1 may be delayed due to the synchronization control hydraulic pressure Ps1 which is not high enough to permit the dog clutch D1 to be restored to its engaged state. To quickly raise the line pressure PL after the engine idling stop control is terminated, it is required to increase the size of the MOP 36. However, the hydraulic control unit 50 provided with the check valve 66 according to the present embodiment does not suffer from the above-described undesired phenomenon when the engine idling stop control is implemented by the electronic control device 100.

The electronic control device 100 may terminate the engine idling stop control implemented as a result of the operation of the shift lever 70 to the second operating position (parking position P or neutral position N) while the vehicle 10 is held at rest, if the shift lever 70 is switched back to the first operating position (forward drive position D or reverse drive position R). In the absence of the check valve 66 in the hydraulic control unit 50, the above-indicated undesirable phenomenon may take place as in the case of the engine idling stop control implemented in the forward drive position D of the shift lever 70, when the engine idling stop control is implemented in response to the operation of the shift lever 70 to the second operating position. The present embodiment wherein the hydraulic control unit 50 is provided with the check valve 66 does not suffer from the above-indicated undesirable phenomenon.

As described above, the hydraulic control unit 50 according to the first embodiment of the invention comprises: the C1 source pressure oil passage 56 connected to the C1 control solenoid-operated valve SL1 so that the C1 source pressure for the C1 control hydraulic pressure Pc1 is applied to the C1 control solenoid-operated valve SL1; the D1 source pressure oil passage 58 connected to the D1 control solenoid-operated valve SL2 so that the synchronization control hydraulic pressure Ps1 is applied to the D1 control solenoid-operated valve SL2; the line pressure oil passage 52 connected to the MOP 36 and the D1 source pressure oil passage 58 such that the pressure PL of the working fluid delivered from the MOP 36 and flowing through the line pressure oil passage 52 is regulated to the predetermined value; the manual valve 62 which is operated to connect and disconnect the C1 source pressure oil passage 56, the line pressure oil passage 52 and the drain oil passage 60 to and from each other, in response to the operation of the manually operated shift lever 70 by the operator of the vehicle 10, such that the C1 source pressure oil passage 56 is connected to the line pressure oil passage 52 when the shift lever 70 is placed in the first operating position (forward drive position D or reverse drive position R), while the C1 source pressure oil passage 56 is connected to the drain oil passage 60 when the shift lever 70 is placed in the second operating position (parking position P or neutral position N); the accumulator 64 connected to the C1 source pressure oil passage 56; and the check valve 66 provided in the D1 source pressure oil passage 58, to prevent the flow of the working fluid in the direction from the D1 control solenoid-operated valve SL2 toward the line pressure oil passage 52. Accordingly, even if the line pressure PL is lowered below the predetermined value due to a flow of the working fluid into the accumulator 64 upon switching of the shift lever 70 from the second operating position to the first operating position, a drop of the D1 source pressure for the synchronization control hydraulic pressure Ps1 to be generated by the D1 control solenoid-operated valve SL2 is prevented by the check valve 66. Thus, the present hydraulic control unit 50 permits the hydraulic actuator 34 to be kept in the adequate or desired operating state, even when the hydraulic actuator 34 is operated with the synchronization control hydraulic pressure Ps1 generated by the D1 control solenoid-operated valve SL2 on the basis of the D1 source pressure applied thereto without a flow of the pressurized working fluid through the manual valve 62, as a result of switching of the shift lever 70 from the second operating position to the first operating position. Namely, the present hydraulic control unit 50 permits the dog clutch D1 operated by the hydraulic actuator 34 to be kept in the adequate or desired operating state upon switching of the shift lever 70 from the second operating position to the first operating position. In addition, it is possible to reduce a need of increasing the size of the MOP 36 to deal with a temporary drop of the line pressure PL upon switching of the shift lever 70 from the second operating position to the first operating position while the engine idling stop control is not implemented. Further, it is possible to reduce a need of increasing the operating speed Ne of the engine 14 to deal with the temporary drop of the line pressure PL, and therefore possible to improve the fuel economy of the engine 14 and to reduce the operating noise of the engine 14.

The present hydraulic control unit 50 is further configured such that the D1 source pressure for the synchronization control hydraulic pressure Ps1 to be generated by the D1 control solenoid-operated valve SL2 can be kept unchanged in the presence of the check valve 66. Accordingly, the dog clutch D1 to be operated by the hydraulic actuator 34 can be kept in the desired operating state after the engine idling stop control is terminated. Further, it is possible to reduce a need of increasing the size of the MOP 36 for the purpose of quickly raising the line pressure PL to the predetermined value upon termination of the engine idling stop control.

In addition, the present hydraulic control unit 50 is provided with the check valve 66 preventing a drop of the D1 source pressure applied to the D1 control solenoid-operated valve SL2 in spite of a temporary drop of the line pressure PL, so that it is possible to initiate an engaging action of the friction clutch C1 in the engaged state of the dog clutch D1, without a need of raising the line pressure PL to the predetermined value, so that the risk of the delayed switching of the friction clutch C1 to its engaged state can be reduced.

Further, the check valve 66 can prevent the drop of the D1 source pressure applied to the D1 control solenoid-operated valve SL2 even if the line pressure PL is temporarily lowered upon switching of the shift lever 70 from its second operating position to its first operating position, so that it is possible to keep the dog clutch D1 in its engaged state, and therefore possible to reduce the risk of the delayed switching of the friction clutch C1 to its engaged state, even where the engaging action of the friction clutch C1 is initiated in the engaged state of the dog clutch D1.

Then, a second embodiment of this invention will be described. It is to be understood that the same reference signs as used in the first embodiment will be used to identify the corresponding elements, which will not be described redundantly.

Second Embodiment

In the first embodiment described above, the MOP 36 is provided as the oil pump device to deliver the pressurized working fluid to the hydraulic control unit 50. In the present second embodiment, the oil pump device includes the MOP 36, and an EOP 90 which is an electric oil pump.

Figure 3:
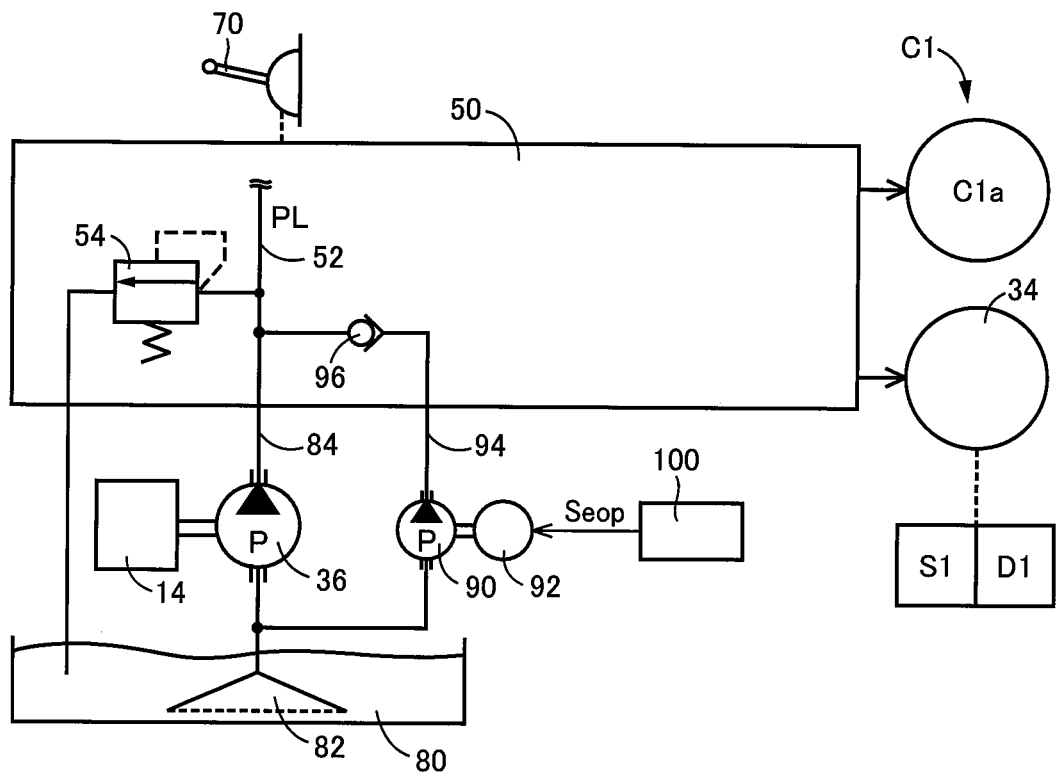
FIG. 3 is a view showing a hydraulic control unit constructed according to a second embodiment of this invention, and a hydraulic pressure source device different from that of the first embodiment of FIG. 2.

Reference is now made to FIG. 3, which is the view showing the hydraulic control unit 50 according to the second embodiment of this invention, and a hydraulic pressure source device different from that of FIG. 2. The hydraulic pressure source device includes the oil pump device. As shown in FIG. 3, an oil pump drive electric motor 92 is provided in the vehicle drive system 12, as a part of the hydraulic pressure source device. The EOP 90 is operated by the electric motor 92, to deliver the pressurized working fluid. The EOP 90 is disposed in parallel with the MOP 36, and the EOP 90 is connected to a delivery oil passage 94 which merges with the delivery oil passage 84 connected to the MOP 36. The delivery oil passages 84 and 94 are both connected to the line pressure oil passage 52. The EOP 90 is controlled according to an EOP control command signal Seop generated by the electronic control device 100.

The MOP 36 and the EOP 90 disposed in parallel with each other suck the working fluid stored in the oil pan 80, through the common strainer 82, so the pressurized working fluid is delivered from the MOP 36 and the EOP 90 to the respective delivery oil passages 84 and 94, which are both connected to the line pressure oil passage 52 as described above. Described more specifically, the delivery oil passage 84 connected to the MOP 36 is connected directly to the line pressure oil passage 52, while the delivery oil passage 94 connected to the EOP 90 is connected to the line pressure oil passage 52 through an EOP check valve 96. The EOP check valve 96 is disposed in an oil passage between the delivery oil passages 84 and 94, to prevent a flow of the working fluid in a direction from the delivery oil passage 84 toward the delivery oil passage 94. The EOP 90 can be operated to deliver the pressurized working fluid irrespectively of the operating state of the engine 14. For instance, the EOP 90 is operated while the engine 14 is automatically held at rest in the process of the engine idling stop control. The EOP 90 is temporarily operated in place of the MOP 36 held at rest. The EOP 90 is a comparatively small-sized pump a maximum delivery rate of which is smaller than that of the MOP 36. The pressure regulator valve 54 regulates the line pressure PL on the basis of the pressure of the pressurized working fluid delivered from at least one of the MOP 36 and the EOP 90.

In the present second embodiment, the line pressure PL can be generated on the basis of the pressure of the pressurized working fluid delivered from the EOP 90 while the engine idling stop control is implemented, so that the dog clutch D1 can be kept in the engaged state, even in the absence of the check valve 66. Further, the provision of the EOP 90 permits the accumulator 64 to be kept charged with the pressurized working fluid in the process of implementation of the engine idling stop control in the forward drive position D of the shift lever 70. Accordingly, it is possible to reduce the risk that the line pressure PL cannot be quickly raised to the predetermined value when the engine idling stop control is terminated. However, there is a risk of a temporary drop of the line pressure PL when the engine idling stop control is terminated upon switching of the shift lever 70 from the second operating position (parking position P or neutral position N) to the first operating position (forward drive position D or reverse drive position R) in the process of the engine idling stop control implemented in the second operating position of the shift lever 70. This temporary drop of the line pressure PL also takes place upon switching of the shift lever 70 from the second operating position to the first operating position during an operation of the engine 14. However, the hydraulic control unit 50 according to the second embodiment is also provided with the check valve 66, so that it is possible to avoid the undesirable phenomenon that the dog clutch D1 is temporarily placed in the released state due to a temporary drop of the D1 source pressure applied to the D1 control solenoid-operated valve SL2.

As described above, the hydraulic control unit 50 according to the second embodiment of the invention is provided with the oil pump device further including the EOP 90 disposed in parallel with the MOP 36 and cooperating with the MOP 36 to deliver the pressurized working fluid. The EOP 90 can deliver the pressurized working fluid even in the process of the engine idling stop control, for instance. However, the pressure of the working fluid flowing through the third oil passage may be temporarily lowered below the predetermined value when the shifting device is operated from the second operating position to the first operating position in the process of the engine idling stop control. Further, the check valve 66 prevents a drop of the D1 source pressure applied to the D1 control solenoid-operated valve SL2, in spite of the temporary drop of the line pressure PL below the predetermined value upon switching of the shift lever 70 from the second operating position to the first operating position in the process of the engine idling stop control. Accordingly, it is possible to reduce a need of increasing the size of the EOP 90 to deal with the temporary drop of the line pressure PL.

While the preferred embodiments of this invention have been described in detail by reference to the drawings, it is to be understood that the present invention may be otherwise embodied.

In the illustrated embodiments, the hydraulic control unit 50 is provided to control a plurality of hydraulic actuators in the form of the hydraulic actuator C1$a$ for the friction clutch C1, and the hydraulic actuator 34 for the dog clutch D1. However, the hydraulic control unit according to the present invention is equally applicable to a plurality of any other hydraulic actuators, for example, to hydraulic actuators for a plurality of frictional coupling devices such as friction clutches or brakes, or hydraulic actuators each of which is provided to generate a thrust force to change an effective width of a groove defined by and between stationary and movable rotary members of a corresponding one of a pair of pulleys of a known continuously variable transmission of a belt or chain type. In other words, the automatic transmission having the plurality of hydraulic actuators may be a step-variable automatic transmission having a plurality of operating positions selectively established with engaging actions of selected combinations of a plurality of coupling devices, or an automatic transmission having a first power transmitting path through which input and output rotary members are connected to each other through a gear mechanism, and a second power transmitting path through which the input and output rotary members are connected to each other through a continuously variable transmission constructed as described above. For instance, the first power transmitting path is established with engaging actions of a first frictional coupling device and a dog clutch, while the second power transmitting path is established with an engaging action of a second frictional coupling device disposed in series with the continuously variable transmission.

In the illustrated embodiments, the pressure of the pressurized working fluid delivered from the MOP 36 and/or the EOP 90 is regulated into the line pressure PL. However, the line pressure PL is further regulated to a predetermined modulator pressure by a modulator valve.

In the illustrated first embodiment, the MOP 36 is provided as the oil pump device for delivering the pressurized working fluid to the hydraulic control unit 50. In the illustrated second embodiment, the MOP 36 and the EOP 90 are provided as the oil pump device. However, the oil pump device provided to deliver the pressurized working fluid to the hydraulic control unit 50 may be replaced by any other configuration, for example, an oil pump device including at least the EOP 90.

In the illustrated embodiments, the manual valve 62 is mechanically linked with the shift lever 70. However, the manual valve 62 may be replaced by a manual valve not mechanically linked with the shift lever 70. In this case, the manual valve is operated to a selected one of its operating positions by an actuator which is electrically controlled according to the presently selected operating position POSsh of the shift lever 70.

It is to be further understood that the present invention may be embodied with various other changes and modifications, which may occur to those skilled in the art.

NOMENCLATURE OF ELEMENTS

12: vehicle drive system
14: engine (drive power source)
24: automatic transmission
34: hydraulic actuator (second hydraulic actuator)
36: MOP (mechanical oil pump)
50: hydraulic control unit
52: line pressure oil passage (third oil passage)
56: C1 source pressure oil passage (first oil passage)
58: D1 source pressure oil passage (second oil passage)
60: drain oil passage
62: manual valve
64: accumulator
66: check valve
70: shift lever (manually operated shifting device)
90: EOP (electric oil pump)
92: electric motor (oil pump drive electric motor)
C1: friction clutch (first coupling device; frictional coupling device)
C1$a$: hydraulic actuator (first hydraulic actuator)
D1: dog clutch (second coupling device)
Pc1: C1 control hydraulic pressure (first hydraulic pressure)
Ps1: synchronization control hydraulic pressure (second hydraulic pressure)
PL: line pressure (predetermined hydraulic pressure)
PT: power transmitting path
SL1: C1 control solenoid-operated valve (first electromagnetic valve)
SL2: D1 control solenoid-operated valve (second electromagnetic valve)

What is claimed is:

1. A hydraulic control unit of a drive system of a vehicle including an automatic transmission having a plurality of hydraulic actuators, and an oil pump device configured to pressurize a working fluid for controlling the hydraulic actuators, comprising:
  a first electromagnetic valve for generating a first hydraulic pressure to operate a first hydraulic actuator of the plurality of hydraulic actuators;
  a second electromagnetic valve for generating a second hydraulic pressure to operate a second hydraulic actuator of the plurality of hydraulic actuators;
  a first oil passage connected to the first electromagnetic valve so that a source pressure for the first hydraulic pressure is applied to the first electromagnetic valve;
  a second oil passage connected to the second electromagnetic valve so that a source pressure for the second hydraulic pressure is applied to the second electromagnetic valve;
  a third oil passage connected to the oil pump device and the second oil passage such that a pressure of the working fluid delivered from the oil pump device and flowing through the third oil passage is regulated to a predetermined value;
  a manual valve which is operated to connect and disconnect the first oil passage, the third oil passage and a drain oil passage to and from each other, in response to an operation of a manually operated shifting device by an operator of the vehicle, such that the first oil passage is connected to the third oil passage when the shifting device is placed in a first operating position, while the first oil passage is connected to the drain oil passage when the shifting device is placed in a second operating position;
  an accumulator connected to the first oil passage; and
  a check valve provided in the second oil passage, to prevent a flow of the working fluid in a direction from the second electromagnetic valve toward the third oil passage.

2. The hydraulic control unit according to claim 1, wherein the oil pump device includes a mechanical oil pump operated by an engine provided as a drive power source of the vehicle, to deliver the pressurized working fluid.

3. The hydraulic control unit according to claim 2, wherein the oil pump device further includes an electric oil pump which is disposed in parallel with the mechanical oil pump and which is operated by an oil pump drive electric motor, to deliver the pressurized working fluid.

4. The hydraulic control unit according to claim 1, which is configured to control the first hydraulic actuator for operating a first coupling device, and the second hydraulic actuator for operating a second coupling device, such that an engaging action of the second coupling device is preferentially initiated prior to a moment of initiation of an engaging action of the first coupling device.

5. The hydraulic control unit according to claim 1, which is configured to control the first hydraulic actuator for operating a frictional coupling device, and the second hydraulic actuator for operating a dog clutch, such that the frictional coupling device and the dog clutch are both brought into engaged states, to establish a power transmitting path through the automatic transmission.

6. The hydraulic control unit according to claim 1, which is configured to control the automatic transmission such that the automatic transmission is placed in a power transmitting state in which a power transmitting path is formed through the automatic transmission in the first operating position of the manually operated shifting device, and is placed in a power cutoff state in which the power transmitting path is not formed through the automatic transmission in the second operating position of the manually operated shifting device.

\* \* \* \* \*